July 22, 1952 A. L. W. WILLIAMS 2,604,321

MAGNETIC RECORDING AND REPRODUCING

Filed Aug. 20, 1948 2 SHEETS—SHEET 1

FIG. I

INVENTOR
ALFRED L. W. WILLIAMS
BY
Michael S. Pineles
ATTORNEY

July 22, 1952 A. L. W. WILLIAMS 2,604,321

MAGNETIC RECORDING AND REPRODUCING

Filed Aug. 20, 1948 2 SHEETS—SHEET 2

INVENTOR
ALFRED L. W. WILLIAMS
BY
Michael S. Pinelas
ATTORNEY

Patented July 22, 1952

2,604,321

UNITED STATES PATENT OFFICE 2,604,321

MAGNETIC RECORDING AND REPRODUCING

Alfred L. W. Williams, Cleveland Heights, Ohio, assignor to The Brush Development Company, Cleveland, Ohio, a corporation of Ohio Application August 20, 1948, Serial No. 45,288

4 Claims. (Cl. 271—2.6)

This invention relates to a system and methods for synchronizing the speed at which a magnetic record transducing operation is carried on, with the progress of another event or program, such as with the timed frequency of a conventional alternating-current power system, or with the picture-frame frequency at which a motion picture film is advanced in projecting a motion picture, or the like.

Among the objects of the invention are novel synchronizing systems and methods in which a moving magnetic record-carrying member is provided with a ray-discernible control signal along the path of its motion for producing an alternating timing signal of a timing frequency corresponding to its speed, which is correlated with the timing frequency of an alternating electric signal representing the progress of another event or program, for synchronizing the progress of the magnetic record transducing operation with the progress of such other program.

The foregoing and other objects of the invention will be best understood from the following description of exemplifications thereof, reference being had to the accompanying drawings, wherein.

Figure 1:
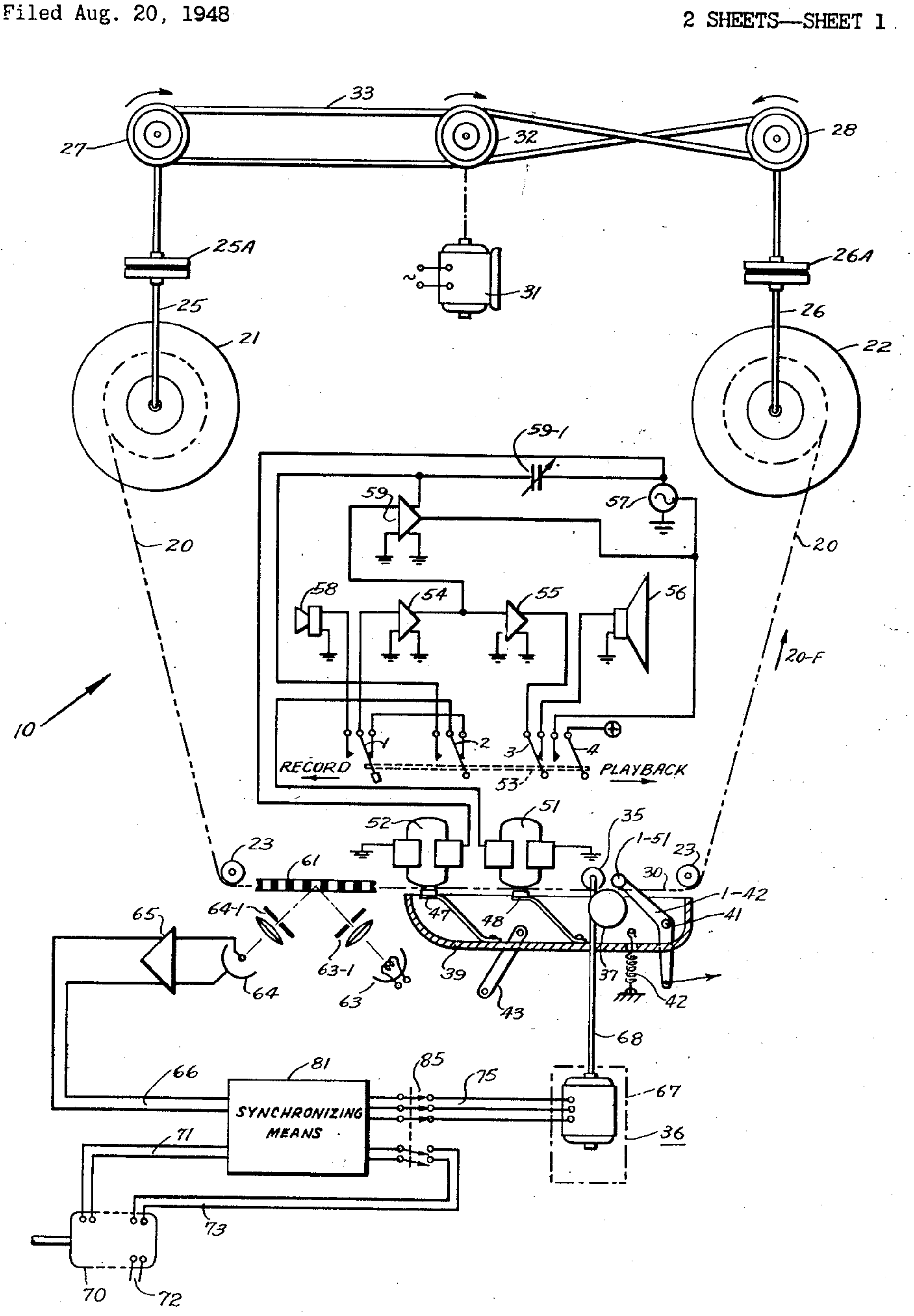
Figure 1 is a simplified diagrammatic view illustrating the general relationship of the principal elements of a synchronizing system exemplifying the invention.

In Figure 1 there is shown in a simplified diagrammatic manner, the general relationship of the principal mechanical, magnetic and electrical elements of a magnetic record-transducing apparatus generally designated 10. Although suitable for operation with other types of record media, such as magnetic record wires or filaments, the apparatus shown will be described as operating with a magnetic recording member 20, indicated by a dash-double-dot line, formed of a thin, elongated record member such as a tape made of paper, or a plastic, or a synthetic resin compound, having at least one exposed surface provided with a layer containing a substantially uniform distribution of permanently magnetizable powder particles.

The magnetic recording member 20 is arranged to be stored in spirally coiled form on two reels 21, 22 between which it is impelled or reeled along an intermediate record-transducing path 30, shown extending between the two guide post members 23. Although the principles of the invention are applicable for use in a magnetic recording apparatus in which the record-transducing apparatus is carried along one trace while the record member is reeled in one direction, and another adjacent magnetic record trace while the magnetic record member is reeled in opposite direction, the recording apparatus shown is designed for carrying on record-transducing operations only when the record member 20 is impelled in the direction of the arrow 20-F while it is being reeled from reel 21, hereinafter designated as the supply reel, onto reel 22, hereinafter designated as the take-up reel. The two reels 21, 22 are shown mounted on two reel shafts 25, 26, which are coupled through slip clutches 25-A, 26-A, such as friction or magnetic clutches, to reel drive pulleys 27, 28. The reel drive pulleys 27, 28 are arranged to be selectively driven by an electric motor 31 shown provided with a drive pulley 32 for driving the two reel pulleys 27, 28 through a belt 33. The belt 33 is crossed over so that when the motor 31 is energized to rotate motor pulley 32 in the direction of the arrow, the two reel pulleys 27, 28 will be driven in opposite directions so as to tend to reel the record member 20 on the supply reel 21 in clockwise direction, and on reel 22 in counterclockwise direction, as indicated by the angular arrows applied to the two reels.

The magnetic record-transducing apparatus is also provided with additional record drive means for driving the record member 20 at a desired record-transducing speed. In the form shown, the record member 20 is arranged to be impelled at the desired record-transducing speed by a revolvably mounted, generally circular, shaft-like capstan member 35 which is rotated by a drive motor assembly generally designated 36.

The record tape member 20 is arranged to be selectively coupled to the peripheral surface portion of the rotating capstan 35 by a rotatably mounted coupling roller 37 mounted on a coupling arm 39 pivotally mounted, as on a pivot pin 41. The coupling arm 39 is shown biased, as by a spring 42, to a position in which its coupling roller 37 is held spaced from the facing surface portion of the capstan 35 to remove the coupling driving connection between the record member 20 and the capstan 35, unless the coupling arm is set in the operative position shown, as by applying a setting movement to a setting link 43 through a suitable setting means (not shown).

In general, the magnetic record-transducing apparatus 10 shown is of the type described in my co-pending application Serial No. 732,970, filed March 7, 1947. It is so designed that the speed at which the record member 20 is impelled during a record-transducing operation, is determined solely by the speed of the capstan member 35, the take-up reel 22 being driven with a force just sufficient to prevent the tape member 20 from becoming slack as it is impelled at the desired transducing speed along the record-transducing path 30 by the capstan 35.

The apparatus 10 of Figure 1 is also shown provided along the transducing path 30 with a record-transducing head 51 and a record-erasing head 52, each provided with windings and a magnetic core structure which has pole pieces separated by a non-magnetic gap along which the exposed magnetic record surface of the record member 20 is moving in the direction of the arrow 20-F during a magnetic recording or playback process. The portions of the record member 20 passing the pole gaps of the two heads 51, 52 are held coupled to the pole faces by coupling pads 47, 48 which are carried by spring arms of the coupling arm 39 by means of which the tape is selectively coupled to the capstan 35 and the heads 51, 52 when a record-transducing operation is carried on.

As shown in Figure 1, according to the invention, with such drive the record track 20 may be instantaneously stopped at any time during a transducing operation, as by a decoupling member such as pin 1—51 of a lever 1—42 pivotally mounted on the pivot pin 41 of the capstan coupling lever, which pin 1—51 lifts the tape 20 from the capstan and clamps it against roller 37 when lever 1—42 is turned counterclockwise, as indicated by an arrow applied to its free end.

The transducing apparatus 10 is arranged to carry on magnetic recording and reproducing operations under the control of a multi-blade transducing selector switch 53 which controls the electric circuit connections of the record-transducing head 51 and the erase head 52 to the amplifier and the signal pick-up and reproducing devices. The selector switch 53 shown may be a standard multi-blade switch which is manually operated by a knob between the right-hand playback position shown, and the opposite recording position.

In the right-hand playback position, the selector switch 53 establishes the following playback circuits: The contact blades 1 and 2 connect the windings of the transducing head 51, which operates as a playback head, to the input side of the pre-amplifier 54, the output of which is impressed through an additional amplifier stage 55 and a circuit portion including contact blade 3 on the reproducing device or loudspeaker 56, the circuits being completed by the conventionally shown ground connections.

When the selector switch 53 is in the opposite left-hand recording position, it establishes the following recording circuits: Contact blade 4 connects a source of high frequency oscillations, such as a supersonic oscillator 57, to a source of positive electric power supply indicated by B+, thereby energizing the oscillator 57 and starting its operation. The oscillator 57 is connected directly to the windings of the erasing head 52. This circuit as well as the other transducing circuits here described are completed by the conventional ground connections shown. The high-frequency erasing current supplied to the erasing head 52 is sufficient to produce across the gap of the erasing head an alternating flux strong enough to erase any magnetic signal records previously impressed on the magnetic medium of the record member 20 and to restore the magnetic elements thereof to magnetically neutral condition.

After being subjected to the magnetic erasing action by the erasing head 52, each magnetic element of the moving record member 20 is subjected by the magnetic transducing head 51 to the combined action of a magnetic record flux produced by amplified signal currents which are to be recorded, and a superposed, high-frequency biasing flux component. A conventionally shown microphone 58 serves as the source of electric signals which are to be recorded, and blade 1 of the selector switch 53, in its left-hand recording position, connects the microphone to the input side of the pre-amplifier 54. The output of this pre-amplifier is impressed on an additional recording amplifier stage 59, the output of which is supplied to the windings of the record-transducing head 51 by a circuit including the contact blade 2 of switch 53, in the left-hand recording position.

The high-frequency bias component of the recording flux is produced in the recording head 51 by a high frequency current component derived from the oscillator 57 through an adjustable coupling condenser 59—1. The coupling condenser 59—1 and the other circuit elements of the system are designed and adjusted to mix a suitable component of the high-frequency current produced by the oscillator 57 with the amplified signal current supplied by the signal source 58 in such manner as to produce in the non-magnetic gap region of the recording head 51 the desired combination of signal recording flux and superposed high-frequency biasing flux at which the signals are magnetically recorded with a minimum of distortion.

In general, when recording signals of the audible frequency range, good results are obtained by using high-frequency biasing flux of about 20 to 30 k.c. per second in frequency, and the same source of high-frequency currents may be used for supplying high-frequency erasing current to the erasing head 52. Instead of the high-frequency erasing head 52, a permanently magnetized erasing head may be utilized for restoring the magnetic elements of the magnetic record member to magnetically neutral condition before subjecting them to a new magnetic recording operation.

There are various applications in which it is desirable to assure that the magnetic record transducing operation is carried on in a desired timed manner. As one example, when a magnetically recorded program is to be broadcast on a conventional broadcast station, it is important that a program of a given specific time length, for instance, of fourteen minutes' duration, should continue for the full fourteen minutes and end exactly at the expiration of the desired fourteen minutes' duration.

However, magnetic record members made of paper or film material will undergo dimension changes with variations in temperature, humidity and age. Since a substantial length of such a record member has to be reeled when playing back a recorded program, such program planned to last fourteen minutes' time, for instance, when played back by a magnetic recording-transducing apparatus, may require a shorter or longer playback time because of changes in the length of the recording medium due to varying temperature and humidity conditions, or age, particularly since a substantial length of the recording medium has to be subjected to a certain amount of strain as it is being reeled from one reel to the other.

As another example, when it is desired to use a magnetically recorded program as a part of a talking motion picture performance, it is important that the magnetically recorded program shall be synchronized in time with the projected motion picture.

The present invention is based on the concept of securing the desired synchronization of the timed progress of a magnetic record-transducing operation with the progress of another operation, by providing the entire length of the magnetic record member on which the desired program is magnetically recorded, with an optically, or in general, a ray-discernible timing record of a substantially constant timing frequency during proper synchronization for producing with the timing record of the magnetic record member an electric alternating timing signal output of a corresponding timing frequency, and synchronizing the so obtained electric transducing timing output produced by the progress of a magnetic record-transducing operation, with an additional electric alternating timing signal output of about the same frequency produced by the timed progress of operation of another operating device.

The principles of the invention based on the foregoing concept, will now be explained with reference to one form of the invention shown diagrammatically in Figure 1. The record member 20 which advances the magnetically recorded program as the record member 20 is reeled from reel 21 onto reel 22, is provided along one of its exposed surfaces with a light ray or optically discernible timing record 61 which is shown formed by a sequence of differently colored bars, black and white, for instance, extending across the width of the record tape member 20 throughout the entire length on which the program that is to be played back is magnetically recorded. In conventional magnetic record tapes, which are provided along one surface with an exposed magnetic record track surface of permanently magnetizable powder particles, the opposite or back side of the tape may be readily imprinted with a sequence of equally spaced bars of different light reflecting properties, which will serve as a ray or optically discernible timing record of constant frequency extending along the length of the tape.

A light beam of a light source 63 is focused through a suitable optical slit 63—1 on a portion of the back surface of the moving magnetic record tape member 20 provided with the ray-discernible timing record 61, so that the rays of the light beam reflected from the illuminated timing record area 61 of the record member 20 will be transmitted through a suitable optical system 64—1 to a light ray responsive means such as a conventional photo-cell 64, for producing at the electrode surfaces of the photo-cell 64 an electric alternating timing signal output.

The electrodes of the photo-cell 64 are connected to a suitable amplifier 65 which is arranged to deliver to the output line 66 an electric alternating transducing timing signal output representing the speed at which the ray discernible timing record 61 of the magnetic record tape member 20 is advanced past the light or ray-responsive photo-cell 64, this also being the speed at which the magnetically recorded signal program is played back while the record member is impelled by the capstan 35 from one reel 21 onto the other reel 22.

The progressive timed operation of the magnetic record-transducing device 10 is designed to be synchronized with the progressive timed operation of an additional operating system or device 70 which is designed to operate at a certain desired progressive rate or speed, and to produce and supply to its output line 71 an electric alternating timing signal output of a timing frequency characteristic of the progress or speed of its operation. The additional operating system 70 may form, for instance, part of the synchronous electric generator of an electric power system which is arranged to be driven by a steam turbine which is regulated in a conventional, known, accurate timing way, so that the generator delivers to the output line 71 a timed frequency electric current of a constant frequency such as sixty cycles per second, at which conventional timed frequency electric power systems operate. As an alternative, a stable, conventional, electric, crystal-controlled precision timing oscillator, such as used in synchronous timing clocks of the type manufactured by General Radio Company, may form the additional progressively operating device 70.

Alternatively, the additional operating device 70 may represent a conventional motion picture projector, having an electric motor which operates the projector and advances the film, the projector including conventional means for delivering to the output line 71 an electric alternating timing signal of a frequency corresponding to the speed at which the picture frames of the motion picture film are advanced in the projection process. Arrangements for deriving from a motion picture film a timing signal corresponding to the speed at which the frames of the motion picture films are projected, of the general type described in Mees et al. Patent No. 1,976,355, are well known and require no further description. In general, the sprocket holes of the motion picture film may be directly used as a constant frequency timing record for producing an electric alternating timing signal corresponding to the speed at which the film is projected.

As indicated in Figure 1, the additional operating device 70 is shown provided with input line conductors 72 representing, for instance, power supply connections for supplying operating energy to the electric operating elements associated with the operating device 70. The additional operating device 70 is also shown provided with regulating line conductors 73 for supplying to the additional operating device 70 an electric regulating output for regulating the progress or speed at which the additional device, such as a motion picture projector projects the film, or in general, operates, for assuring that an electric timing signal supplied to the timing output line 71 is of the desired timing frequency characteristic of the progress of operation of the additional operating device 70.

In the magnetic recording device described above in connection with Figure 1, the speed at which a magnetic record program is played back in conjunction with the magnetic head 51, is determined by the speed at which the capstan 35 which drives the record member at the desired speed, is driven by the electric motor assembly 36.

The electric motor assembly 36 comprises an electric motor provided with speed regulating means indicated by dotted lines 67, for driving the drive shaft 68 of the motor assembly at the desired regulated speed at which the capstan 35 is to be rotated for transducing the magnetic record at the proper synchronized speed. The motor assembly 36 comprises a conventional electric motor which is energized through supply line conductors of a conventional electric power line, such as the conventional alternating power used to operate alternating current motors.

Various known motor assemblies the speed of which may be regulated by a regulating electric regulating output, may be used for the motor assembly 36. Thus, the motor assembly may have a conventional alternating current synchronous motor supplied with alternating power current for driving the shaft 68 of the assembly through a conventional magnetic clutch of the type described, for instance, in Kellogg Reissue Patent No. 19,270, so as to make it possible to drive the shaft at a regulated desired speed, determined by the magnitude of direct current regulating output supplied through the regulating line 75 to the direct current winding of the clutch.

With such drive arrangement, the driving motor of the motor assembly 36 must be chosen to operate its drive shaft at a speed greater than the maximum speed at which the drive shaft 68 of the motor assembly has to drive the capstan 35 throughout the range of the desired speed regulation.

The form of synchronizing system of the invention shown diagrammatically in Figure 1, is also provided with synchronizing means generally designated 81, which is connected to the electric timing output circuit 66 of the magnetic record-transducing apparatus 10 and to the electric timing output 71 of the associated operating device 70 for detecting a departure from synchronism between the alternating electric timing outputs delivered to the two timing output circuits 66, 71, and for producing a corresponding electric regulating output supplied through the regulating output circuit 75 to the regulating means 67 of the drive motor assembly 36, for regulating the speed at which the record member 20 is impelled by the capstan 35 so that the alternating electric timing outputs of the timing output circuits 66, 71 of the two systems 10, 70 are at all times in synchronism.

Figures 2, 3:
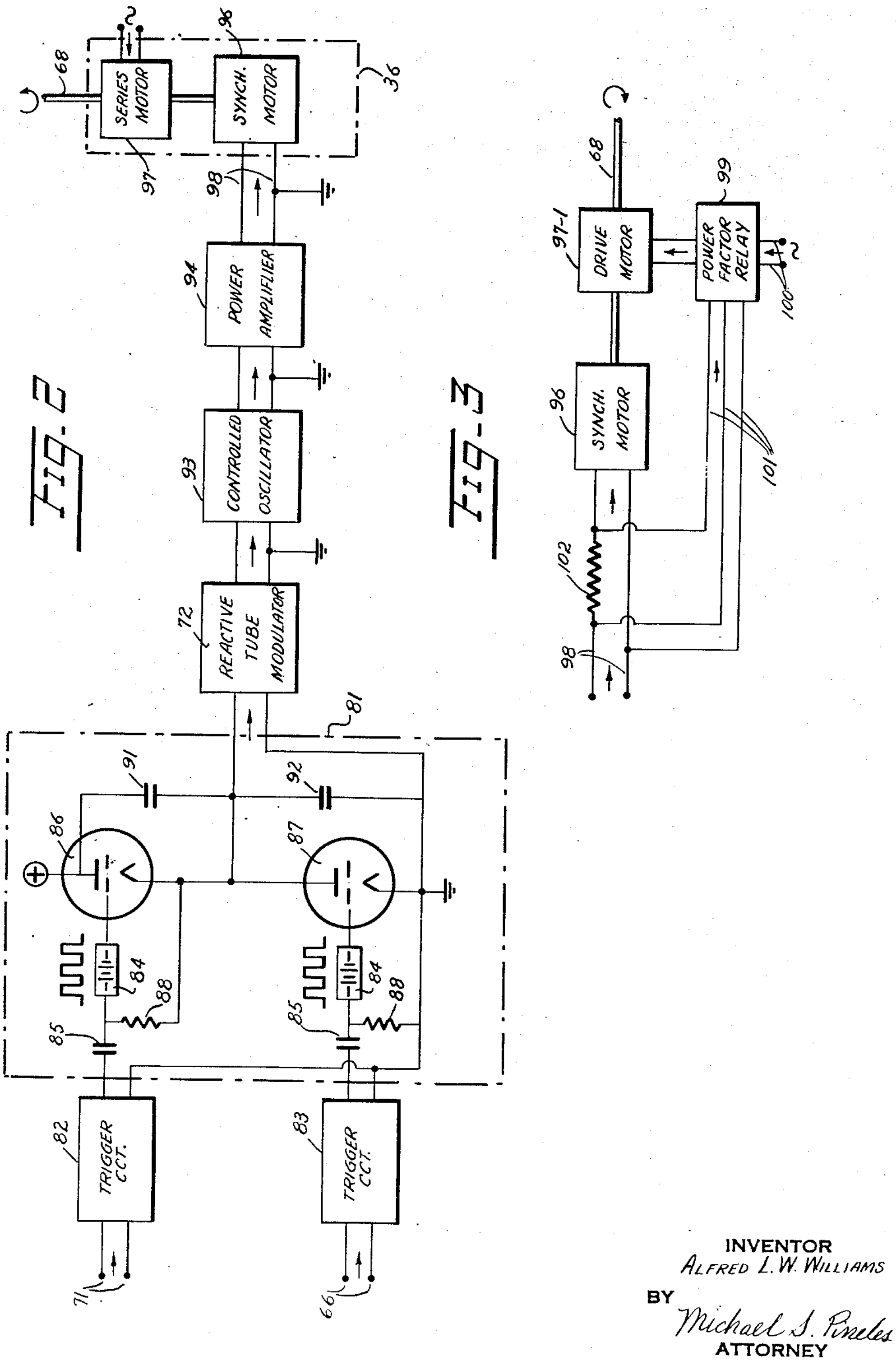
Figure 2 is a simplified diagrammatic view of the general relationship of representative elements of one form of synchronizing arrangement for the synchronizing system of Figure 1.
Figure 3 is a similar diagrammatic view of a modification of the arrangement of Figure 2.

Figure 2 is a simplified diagram of the principal elements of one form of synchronizing arrangement 81, motor assembly 36 and motor speed regulating means for a synchronizing system as in Figure 1, illustrating in a general manner the principles of the invention. It comprises a trigger circuit 82 connected to the output line 71 for the additional operating device 70, and adapted to produce a unidirectional rectangular pulse wave output having a rectangular pulse for each cycle or alternation of the timing frequency wave output from operating device 70. Such trigger circuits are well known in the electronic art, and need no further description here. A similar trigger circuit 83 is connected to the output line 66 on which appears the transducing timing signal characteristic of the speed of the recording member 20, and similarly produces a rectangular pulse wave output having one pulse for each cycle or alternation of the transducing timing signal. The two trigger circuits 82, 83 are so designed that each delivers an exactly alike electrical pulse for each cycle of the two alternating timing outputs supplied to the two circuits 66, 71 of the two operating systems, respectively, irrespective of the variations of the amplitude or wave shape of the alternating timing outputs supplied to the circuits 66, 71 of the two operating devices or systems 10 and 70 respectively.

The two wave output circuits 66, 71 are connected to a discriminator circuit means 81, which is designed to produce an electric discriminator output signal corresponding in sense and level to the departure of the frequency of the pulse wave by one of the two timing outputs 66, 71 from the frequency of the pulse wave supplied by the other timing output.

Various forms of such electrical discriminator circuits are known in the art. A typical representative discriminator circuit comprises storing means such as a condenser element which is interconnected through two electronic amplifier circuits to the two pulse wave supply circuits, so that each wave pulse of one supply circuit operates to add a fixed increment of energy to one of the condenser elements, and so that each wave pulse of the other pulse supply circuit operates to remove an equal fixed increment of energy from such condenser element, an increase or decrease of the energy stored in the condenser operating to supply a discriminating output corresponding in sense and direction to the difference in the rate of the wave pulses supplied by the two pulse wave supply circuits. The two electronic amplifier circuits may be arranged to be connected either parallel or in series relationship to each other for securing such discriminator action.

One form of a discriminator 81 based on the principles of the invention is shown in Figure 2. It is indicated as comprising two amplifier vacuum tubes 86, 87 shown as triodes, although other tubes such as pentodes, may be used, each tube having a conventionally shown cathode, anode and grid. The space current paths of the two tubes are shown connected in series between the power supply indicated by a + sign, as a conventional positive plate current supply source for the amplifier tubes and the conventional ground to which the cathode of tube 87 is connected. Each tube may be biased to cut-off, this being indicated conventionally by a bias battery 84 connected in the leads from the two trigger circuits 82, 83 to the control grids of the two tubes 86, 87.

The grid input circuit to each tube includes a series condenser 85 and an input circuit resistance 88. Two similar storage condensers 91, 92 are shown connected between the anode and the cathode of each of the two tubes 86, 87 respectively, to operate as the charge storage means of the discriminator circuit. The midpoint circuit connections between the two condensers to which the circuit connection between the cathode of tube 86 and the anode of tube 87 are connected, and the grounded cathode lead of tube 87, are connected to the input side of the reactive tube modulator 72.

The circuits of the two tubes are so adjusted each time a pulse is applied to the respective tubes, that a part of the charge of the respective shunting condensers 91, 92 will be discharged through the space current part of the respective tube. When the wave pulses of the two pulse supply circuits leading from the trigger circuits 82, 83 to the two tubes are in perfect synchronism, both tubes will be rendered conductive for the same period of duration of the wave pulse, and as a result the charge stored in each of the two condensers will be reduced exactly the same amount and the voltage across the condenser 92 which is impressed on the input side of the reactive tube modulator 72, will not be in any way affected and will not change. However, if the frequency of one of the wave pulses supplied by one trigger circuit changes slightly with respect to the frequency of the wave pulses supplied by the other trigger circuit, the charge in one of the two condensers 91, 92 will be reduced relatively to the charge of the other condenser by the amount corresponding to the frequency departure, thereby changing the voltage of the midpoint connection between the two condensers 91, 92, and thereby regulating the voltage impressed on the input circuit of the reactive tube modulator 72.

With the arrangement shown, condenser 92 retains a normal charge because it is designed so that it will store more energy than can be leaked off in a single space current pulse of tube 87. Likewise, the parameters of the circuits are so chosen that it takes several space current pulses through tube 86 to produce much voltage increase across the storage condenser 92. With such arrangement, the storage condenser 92 is continuously filled with charges supplied by pulses through tube 86 and emptied by pulses discharged through tube 87. The level of the charge of the storage condenser 92 is a measure of the relative frequency departure of the two pulse sources 82, 83, and the variation of this level is impressed by the input circuit connections from the storage condenser 92 on the input electrodes of the reactive tube modulator 72 for regulating its operation.

The discriminator output developed across the condenser 92 is utilized for regulating the speed of the drive motor assembly 36. This may be accomplished by a known controlled electrical oscillator circuit 93 provided with a known reactance tube modulator 72 having a reactance tube which will raise or lower the frequency-generated oscillations in respect to variations of the voltage impressed on the control grid of the reactance tube of such modulator. As indicated in Figure 2, the voltage developed across the storing condenser 92 is impressed on the reactance tube modulator 72 for causing it to raise or lower the frequency of the oscillations generated by the controlled oscillator 93, depending on the sense and magnitude of the departure of the voltage across the storing condenser 92 from a predetermined level corresponding to the condition at which the time pulse waves supplied by the two trigger circuits are in substantially perfect synchronism.

With such arrangement, a departure of the time pulse wave of one of the trigger circuits, such as the trigger circuit 82 from the trigger circuit 83 in one direction, will cause a corresponding departure of the frequency of the oscillations of the oscillator 93, depending on the direction and magnitude of departure of the frequency of the timing wave pulses of the two trigger circuits 82, 83, and represents the deviation of the speed between the record 20 and the operating device 70 which are to be maintained in synchronism.

The motor assembly 36 whch drives the shaft 68 of the recording device and thus determines the speed of the record-advancing member, comprises a synchronous motor 96 and a series motor 97. The synchronous motor 96 is supplied through a supply line 98 with an alternating current produced by the controlled oscillator 93, and supplied to the motor through the amplifier 94. As is known, a series motor may be readily designed and chosen so as to drive a load and supply substantially all its driving power over a substantial range of speed variations thereof, and the operating speed of a device driven by such series motor may readily be operated in a certain desired manner by supplying the synchronous motor of such motor combination with an alternating current supply of the desired corresponding regulating frequency. With such arrangement, the drive shaft 68 of the recording device will receive its major mechanical energy or driving power from the series motor 97. The synchronous motor 96 will, however, serve as a regulator of the speed at which the shaft 68 is driven. Thus, if the shaft 68 is rotating too fast, producing a too rapid movement of the record member, a signal is produced by the discriminator 81, which lowers the frequency of the oscillations of the oscillator 93, thereby causing the synchronous motor to slow down while increasing the load on the series motor 97 until the speed of the drive shaft 68 is reduced to a value at which the frequency of the timing wave supplied to circuit 66 is in desired synchronous relation with the timing output of the output circuit 71. Conversely, if drive shaft 68 is turning too slowly, the frequency of the oscillator 93 will be automatically increased, thereby increasing the speed of the synchronous motor while reducing the load on the series motor until the speed of the drive shaft is increased to a value at which the timing output of the timing circuit 66 is in synchronism and substantially in phase with the timing output of the output 61. With this arrangement, the major amount of driving power is supplied by the regulating series motor 97, and the differential of speed is supplied by the synchronous motor 96, in response to the departure of the frequency of the timing output 66 from the frequency of the timing output 71 of the associated device 70.

Obviously, a similar regulating system may be utilized for regulating the speed of the associated device 70 so as to maintain its timing output 71 in synchronism with the timing output 66 of the recording device. For instance, if the device 70 is a motor of a motion picture projector, its teeth may be regulated in the manner described, so as to cause the successive frames of the motion picture film to project it in desired synchronism to the rate at which the record member 61 is advanced.

Figure 3 shows a modification of the drive motor assembly 36. It is to be understood that the left-hand leads 98 of Figure 3 be connected to the leads 98 at the output of power amplifier 94. In Figure 3, as in Figure 2, the drive shaft 68 is mechanically coupled both to a drive motor 97—1 whose speed may be regulated and to synchronous motor 96. In this circuit, however, substantially all of the energy required for driving shaft 68 is derived from the drive motor 97—1; and, as will be seen, the synchronous motor 96 only assists in determining the amount of power to be supplied to drive motor 97—1 and thereby determines its speed. As is well known, when a synchronous motor is rotating at a speed greater than its synchronous speed, i. e., (the speed corresponding to the frequency of the energy supplied to it), it draws a current with a leading power factor; and, conversely, when the synchronous motor is rotating at less than synchronous speed, it draws a lagging current. This phenomenon is utilized in the system of Figure 3 to control the speed of output shaft 68. In essence, the power factor of the current drawn by the synchronous motor 96 is used as an indication of the deviation of the speed of shaft 68 and synchronous motor 96 from the desired speed indicated by the frequency of the voltage on leads 98. For this purpose, a power factor relay 99 of any conventional type is utilized to control the application of energy from power lines 100 to the drive motor 97—1.

As is customary, the power factor relay is controlled by three leads 101, the uppermost and center lead being connected across a series resistor 102, whereby the voltage therebetween is proportional to the current flow to the synchronous motor 96, and the center and lower leads being connected across the leads 98, whereby the voltage therebetween is the voltage applied to the synchronous motor. The power factor relay then responds to both the current and voltage supplied to synchronous motor 96, and is so arranged that, for a leading power factor, the speed of drive motor 97—1 is reduced, permitting shaft 68 to slow down until the synchronous motor 96 is rotating in synchronism with the input wave supplied to leads 98. Conversely, relay 99 responds to a lagging power factor to increase the excitation of drive motor 97—1 so as to increase the speed of shaft 68, again placing the synchronous motor 96 in synchronism with the voltage across the leads 98. In this way, the speed of drive shaft 68 is varied to maintain it in synchronism with the frequency of the voltage on leads 98, which in turn is responsive to the deviation between the desired speed of record 20 as determined by device 70 and its actual speed as sensed by the ray-discernible control 61 and associated apparatus. In this way the system is kept at the desired speed of rotation, and the desired synchronism between the magnetic recording member 20 and the additional operating system or device 70 is maintained.

In the foregoing description it has been assumed that the additional operating device or system 70 operates at the desired standard speed and that the electric alternating output delivered by it to its timing output circuit 71 serves as the standard timing frequency with respect to which the transducing timing output is regulated, so as to bring it in synchronism with the standard timing output of output circuit 71. However, in many applications, for instance, in using the magnetic record transducing apparatus 10 as a part of a talking motion picture projection arrangement in which the projector is represented by the additional operating device 70, it may be desirable to regulate the speed at which the motion picture film is advanced, so as to maintain it in synchronism with the speed at which the record member 20 is advanced, in which case the frequency of the electric alternating timing output supplied to the timing output circuit 66 as a result of the movement of record member 20 serves as the standard frequency.

In addition, for many operations or applications, the timing frequency output may be derived from the conventional sixty-cycle power lines, whereby the magnetic record-transducing apparatus 10 is maintained in synchronism with the highly accurate remote generator for the power lines.

The expression "magnetic record transducing" as used herein in the specification and claims is intended to mean either the operation of magnetically recording signals on a magnetic recording medium or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that, in construing the breadth of the appended claims, they shall not be limited to the specific exemplifications of the invention described herein.

I claim:

1. A variable motor control circuit comprising a synchronous motor and a drive motor having a common shaft, a source of variable frequency control signal of frequency corresponding to a desired speed of said motors, said source being coupled to the input of said synchronous motor and means responsive to the power factor of current supplied to said synchronous motor for controlling the excitation of said drive motor to vary its speed.

2. In combination: a magnetic record transducing device comprising an elongated magnetic record member having on a surface thereof an exposed ray-discernible timing record, a record advancing member, drive means for driving said record advancing member, signal means including a source of radiant energy arranged to irradiate said timing record, radiation-responsive means in the path of varying radiations transmitted by said timing record from said source for producing a record member alternating electric output of a frequency corresponding to the speed of said record member, means for producing a reference alternating electric output of a fixed frequency, synchronizing means connected to said radiation-responsive means and to said means for producing said reference frequency for detecting a departure from synchronism between said record member frequency and said reference frequency and for producing a regulating electric output in accordance with said departure, and regulating means electrically connected to said synchronizing means and connected to said drive means to change the speed of said drive means and said record member to synchronize the record member frequency with said reference frequency.

3. A device for reproducing a record in a fixed period of time comprising in combination: an elongated record whose length may change having on a surface thereof an exposed ray-discernible timing indicia, a record advancing member, drive means for driving said record advancing member, signal means including a source of radiant energy arranged to irradiate said timing indicia, radiation responsive means in the path of varying radiations transmitted by said timing indicia from said source for producing an alternating electric record output of a frequency corresponding to the speed of said record, reference means for producing a reference alternating electric output, synchronizing means connected to said radiation responsive means and to said reference means for detecting a departure from synchronism between said record frequency and said reference frequency and for producing a regulating electric output in accordance with said departure, and regulating means electrically connected to said synchronizing means and connected to said drive means to change the speed of said drive means and said record to synchronize the record frequency with said reference frequency.

4. A device for reproducing a record in a fixed period of time comprising in combination: an elongated record whose length may change having on a surface thereof an exposed ray-discernible timing indicia, a record advancing member, drive means for driving said record advancing member, signal means including a source of radiant energy arranged to irradiate said timing indicia, radiation responsive means in the path of varying radiations transmitted by said timing indicia from said source for producing an alternating electric record output of a frequency corresponding to the speed of said record, reference means independent of said record for producing a reference alternating electric output whose frequency is independent of the rate of motion of said record, synchronizing means connected to said radiation responsive means and to said reference means for detecting a departure from synchronism between said record frequency and said reference frequency and for producing a regulating electric output in accordance with said departure, and regulating means electrically connected to said synchronizing means and connected to said drive means to change the speed of said drive means and said record to synchronize the record frequency with said reference frequency.

ALFRED L. W. WILLIAMS.

REFERENCES CITED

The following references are of record in the file of this patent:

UNITED STATES PATENTS

| Number | Name | Date |
|---|---|---|
| 1,547,217 | Herman | July 28, 1925 |
| 1,860,502 | Hansen | May 31, 1932 |
| 1,883,562 | Chipman et al. | Oct. 18, 1932 |
| 1,963,246 | Purington | June 19, 1934 |
| 1,976,355 | Mees et al. | Oct. 9, 1934 |
| 1,989,965 | Beverage | Feb. 5, 1935 |
| 2,203,706 | Stockbarger | June 11, 1940 |
| 2,249,820 | Gulliksen | July 22, 1941 |
| 2,250,209 | Shoults et al. | July 22, 1941 |
| 2,443,756 | Williams et al. | June 22, 1948 |